(12) United States Patent
Ni et al.

(10) Patent No.: US 9,871,444 B2
(45) Date of Patent: Jan. 16, 2018

(54) INTEGRATED CIRCUIT WITH CONFIGURABLE CONTROL AND POWER SWITCHES

(71) Applicant: Texas Instruments Incorporated, Dallas, TX (US)

(72) Inventors: Chuan Ni, Plano, TX (US); Timothy P. Pauletti, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/976,539

(22) Filed: Dec. 21, 2015

(65) Prior Publication Data

US 2016/0190926 A1 Jun. 30, 2016

Related U.S. Application Data

(60) Provisional application No. 62/096,779, filed on Dec. 24, 2014, provisional application No. 62/096,802, filed on Dec. 24, 2014.

(51) Int. Cl.
*H02M 3/158* (2006.01)
*G05F 1/56* (2006.01)
*H02M 1/00* (2006.01)

(52) U.S. Cl.
CPC .............. *H02M 3/158* (2013.01); *G05F 1/56* (2013.01); *H02M 2001/0025* (2013.01)

(58) Field of Classification Search
CPC ......... H02M 3/155–3/1588; H02M 2001/0045
See application file for complete search history.

(56) References Cited

U.S. PATENT DOCUMENTS

| 7,009,369 | B2 | 3/2006 | Ni et al. | |
| 7,148,607 | B2 | 12/2006 | Sato | |
| 7,253,596 | B2* | 8/2007 | Yamamoto | H02M 3/1588 323/281 |
| 7,679,350 | B2* | 3/2010 | Falvey | H02M 3/158 323/224 |
| 7,733,671 | B2* | 6/2010 | Chen | H02M 3/158 323/222 |
| 7,812,580 | B2* | 10/2010 | Watanabe | H02M 3/1588 323/268 |
| 8,040,116 | B2 | 10/2011 | Xia et al. | |
| 2009/0108820 | A1* | 4/2009 | Mirea | H02M 3/1582 323/271 |
| 2009/0309559 | A1* | 12/2009 | Xia | G05F 1/56 323/265 |

(Continued)

*Primary Examiner* — Yusef Ahmed
(74) *Attorney, Agent, or Firm* — Lawrence J. Bassuk; Charles A. Brill; Frank D. Cimino

(57) ABSTRACT

Disclosed examples include integrated circuits configurable according to sensed circuit conditions to provide configurable power converter topologies with externally connected circuitry to implement buck, boost, buck-boost, low dropout and/or hot-swap power converters. The ICs include one or more sets of series connected high and low side transistors connected with corresponding IC pads to allow connection to external circuitry to form a particular power converter configuration. The IC includes a control circuit and a configuration circuit to sense a circuit condition of the IC and to configure the control circuit to provide switching control signals to the transistors to implement one of a plurality of power converter topologies.

5 Claims, 17 Drawing Sheets

(56) References Cited

U.S. PATENT DOCUMENTS

| | | | |
|---|---|---|---|
| 2010/0066169 A1* | 3/2010 | Apfel | H02M 3/156 307/31 |
| 2010/0123442 A1* | 5/2010 | Peterson | H02M 3/1588 323/282 |
| 2010/0123443 A1* | 5/2010 | Grimm | H02M 3/156 323/282 |
| 2011/0018507 A1* | 1/2011 | McCloy-Stevens | H02M 3/1588 323/271 |
| 2011/0037446 A1* | 2/2011 | Engelhardt | H02M 3/1582 323/282 |
| 2011/0187336 A1* | 8/2011 | Wu | G05F 1/10 323/282 |
| 2011/0241636 A1* | 10/2011 | Wu | H02M 3/1584 323/272 |
| 2012/0146594 A1* | 6/2012 | Kobayashi | H02M 3/1582 323/234 |
| 2012/0161732 A1* | 6/2012 | Renton | H02M 3/156 323/275 |
| 2013/0021012 A1* | 1/2013 | Oddoart | H02M 3/156 323/282 |
| 2013/0271101 A1* | 10/2013 | Nanov | H03K 17/162 323/282 |
| 2014/0015507 A1* | 1/2014 | Park | H04B 1/1607 323/304 |
| 2014/0084883 A1* | 3/2014 | Tanabe | H02M 3/1582 323/271 |
| 2014/0347078 A1* | 11/2014 | Qin | G01R 19/0092 324/713 |
| 2015/0061615 A1* | 3/2015 | Michishita | H02M 3/1588 323/271 |
| 2015/0160668 A1* | 6/2015 | Pujol | G05F 1/565 323/280 |
| 2015/0340952 A1* | 11/2015 | Manohar | H02M 3/158 323/271 |
| 2015/0364995 A1* | 12/2015 | Chen | H02M 3/158 323/271 |
| 2015/0365000 A1* | 12/2015 | Dhuyvetter | H02M 3/1582 323/271 |
| 2015/0381039 A1* | 12/2015 | Hari | H02M 1/15 323/271 |

* cited by examiner

INTEGRATED CIRCUIT WITH CONFIGURABLE CONTROL AND POWER SWITCHES

REFERENCE TO RELATED APPLICATION

Under 35 U.S.C. §119, this application claims priority to, and the benefit of, U.S. provisional patent application Nos. 62/096,779, entitled "POWER LEGO (CONFIGURABLE POWER BLOCKS)", filed on Dec. 24, 2014, and 62/096,802, entitled "POWER LEGO (CONFIGURABLE POWER BLOCKS)", filed on Dec. 24, 2014, the entirety of which applications are hereby incorporated by reference.

TECHNICAL FIELD

The present disclosure relates to power converters and more particularly to configurable circuits for making power converters.

BACKGROUND

Power conversion circuits or power converters are used in a variety of different power delivery applications, and take many different forms. Switching converters often include one or more switching devices operated with an inductor to provide buck, boost, buck-boost, cuk and other switching converters. Other power conversion applications do not use an inductor, such as low dropout regulators and hot-swap power converters. Each of these converter types requires control signals to be provided to the transistors thereof. A variety of different converter controllers have been developed, which are tailored to the particular power converter topology.

SUMMARY

Disclosed examples include integrated circuits configurable according to sensed circuit conditions to provide configurable power converter topologies with externally connected circuitry to implement buck, boost, buck-boost, low dropout and/or hot-swap power converters. The ICs include one or more sets of series connected high and low side transistors connected with corresponding IC pads to allow connection to external circuitry to form a particular power converter configuration. The IC includes a control circuit and a configuration circuit to sense a circuit condition of the IC and to configure the control circuit to provide control signals to the transistors to implement one of a plurality of power converter topologies.

DETAILED DESCRIPTION

Figure 1:
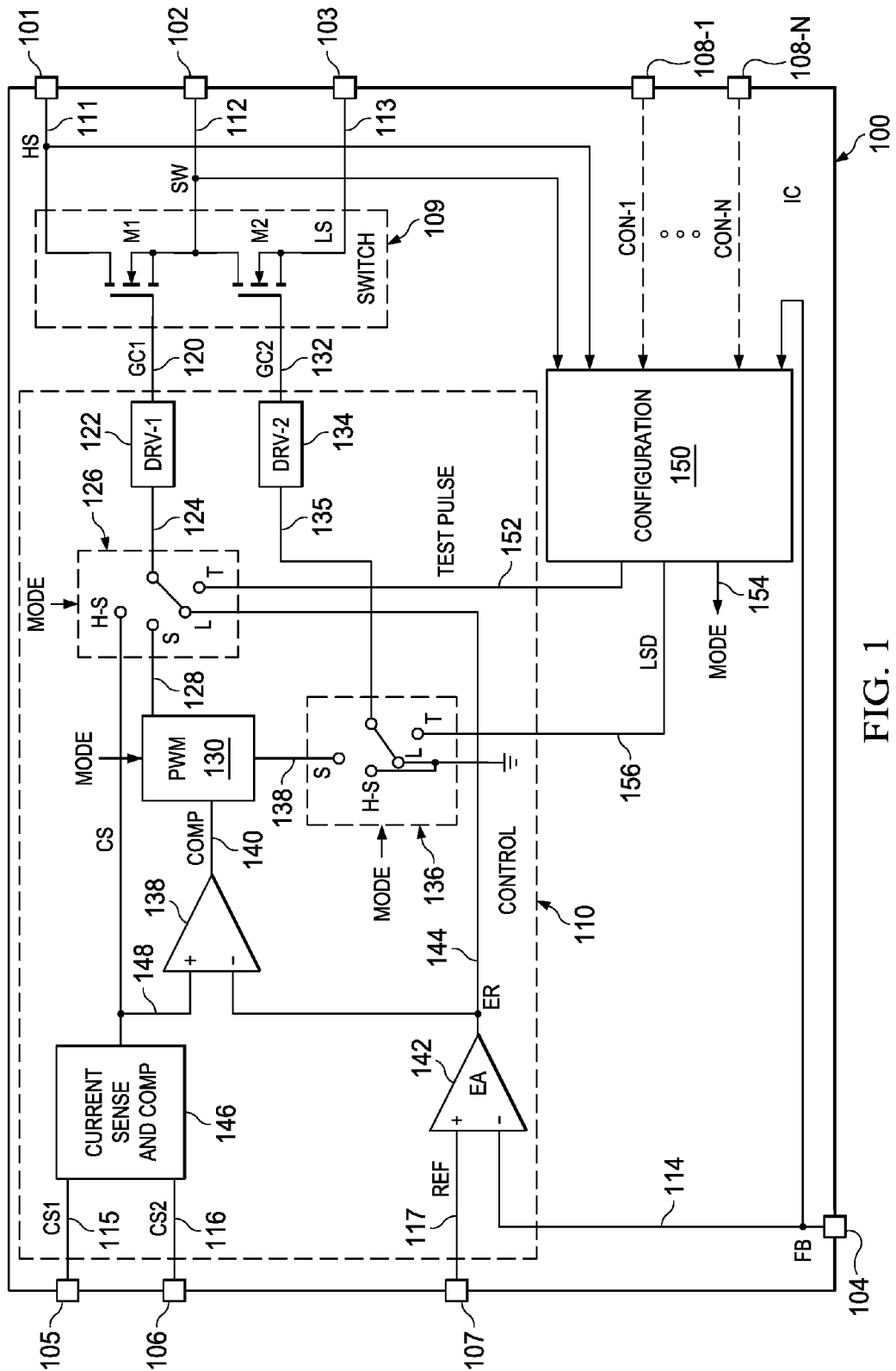
FIG. 1 shows an IC with a half bridge switch circuit, a configurable controller and a configuration circuit.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . ." Also, the term "couple" or "couples" is intended to include indirect or direct electrical connection or combinations thereof. For example, if a first device couples to or is coupled with a second device, that connection may be through a direct electrical connection, or through an indirect electrical connection via one or more intervening devices and connections.

FIG. 1 shows an integrated circuit 100 that includes various terminals, referred to herein as pins or pads, for electrical connection of internal nodes or conductive features to external circuitry. For example, the pads of the IC 100 can be soldered to corresponding solder pads on a host printed circuit board (PCB, not shown), and can be through hole pins, gull wing pins, or other conductive structures providing electrical interconnection with a host system and circuit components external to the IC 100. FIG. 1 illustrates several such pads including first, second and third pads 101, 102 and 103, respectively, for connecting first, second and third internal nodes 111, 112 and 113 with inductors, capacitors, power supplies, constant voltage nodes (e.g., ground connections) and other external circuitry to form a power conversion system or power converter. The IC 100 may include further pads (not shown) for power connections, ground connections, and other circuit connections, the details of which are omitted. The IC 100 includes a switch circuit 109 with first and second (e.g., high and low side) transistors M1 and M2 forming a half bridge circuit connected with the internal nodes 111, 112 and 113 as shown. In one example, the transistors M1 and M2 are N-channel field effect transistors (FETs). In other examples, a combination of N and P-channel FETs can be used (e.g., a P-channel high side FET connected in series with an N-channel low side PET). In other examples, other types of semiconductor switches can be used, such as IGBTs, bipolar transistors, etc. In the illustrated example, M1 and M2 are connected in series with one another between the nodes 111 and 113, and include a common connection at the second internal node 112. In certain applications of the IC 100, the second internal node 112 functions as a switching node, which is designated "SW" in the figures for ease of reference only. The upper connection to the high side transistor M1 at node 111 is designated "HS" and the lower connection to the low side transistor M2 is designated as "LS" for ease of reference only.

The IC 100 further includes a configurable control circuit 110 and a configuration circuit 150. The control circuit 110 provides a first switch control signal GC1 to a gate control terminal of M1, and the circuit 110 provides a second switch control signal GC2 to the gate control terminal of M2. Although the control signals GC described herein are referred to as "switch control signals", the control circuit 110 in certain control modes provides generally continuous control signals GC to operate one or more of the transistors in a linear mode, and in other control modes provides the control signals GC using pulse with modulation or other pulsed waveforms. As further described below, the control circuit 110 is configurable according to sensed circuit conditions to implement buck, boost, buck-boost, low dropout LDO and/or hot-swap power converters or other power converter topologies. The IC pins 101, 102 and 103 allow connection of the switch circuit transistors M1 and/or M2 to external circuitry to form a particular power converter configuration, and a configuration circuit 150 senses one or more circuit conditions of the IC 100 to configure the control circuit 110 to provide switching control signals GC1 and/or GC2 to the transistors M1 and M2 to implement one of a plurality of power converter topologies. In the example of FIG. 1, the control circuit 110 is selectively operative according to one or more mode control signals 154 (designated "MODE" in the figures) to operate in one of a plurality of control modes according to a sensed circuit condition of the IC 100. The configured control mode sets the control circuit 110 in one example to operate the high and low side transistors M1 and M2 with an external circuit to implement one of a buck converter, a boost converter, a low dropout LDO power converter or a hot-swap converter. In this regard, the configuration circuit 150 automatically configures the control circuit 110, allowing use of the IC 100 as a fundamental building block in a variety of different host circuits to create a number of different power conversion systems.

In the example of FIG. 1, the first switch control signal GC1 is provided on a line or node 120 by a first driver circuit 122 of the control circuit 110 (labeled DRV-1), and the second switch control signal GC2 is provided on a line 132 by a second driver circuit 134 (DRV-2). The first driver circuit 122 receives a signal via a line 124 from a first switch 126, and the second drive circuit 134 receives an input signal via line 135 from a second switch 136. The switches 126 and 136 receive the MODE signal or signals from the configuration circuit 150. The configuration circuit 150 senses one or more circuit conditions of the IC 100, and provides the mode control signal MODE to configure the control circuit 110 according to the sensed circuit condition. In one example, the configuration circuit 150 provides a dual bit binary coded signal MODE on two lines 154 to encode one of four possible control modes.

In a test mode (designated "T"), the switch 126 is in the "T" position to provide a test pulse signal ("TEST PULSE") from line 152 from the configuration circuit 150 on the line 124 to the first driver circuit 122. In the test mode, the second switch 136 provides the second drive control signal on the line 135 as a low side device (LSD) signal via the line 156 from the configuration circuit 150. In one example, the configuration circuit 150 operates in the test mode to sense a feedback signal FB and the switch node voltage SW via lines 114 and 112, generates a test pulse on line 152 and a low side device signal on line 156, and senses external circuitry in order to differentiate between buck converter or boost converter topologies from LDO topologies based on the detected presence or absence of an inductor in the external circuitry. In one implementation, the configuration circuit 150 and the control circuit 110 operate to test the presence or absence of a connected inductor according to the principles set forth in U.S. Pat. No. 8,040,116, the entirety of which is incorporated by reference herein.

In another example, the configuration circuit 150 is operative to sense a voltage of an integer number N configuration pads 108-1, . . . , 108-N of the IC 100 (labeled CON-1 through CON-N), and the configuration circuit 150 provides the mode control signal MODE to configure the control circuit 110 according to the sensed circuit condition. N can be greater than or equal to 1. For example, the illustrated configuration circuit 150 can set the control circuit 110 in one of four operating modes, which can be dictated by the voltages applied to two pads 108. In one implementation, a host circuit board can connect the individual pads 108 to a supply voltage (e.g., VDD) or to a ground connection, and the configuration circuit 150 senses the voltages applied to the pads 108 in order to determine the selected operating mode for the IC 100.

In a first control mode (designated "L"), the switch 136 provides the input signal to the first driver circuit 122 as an error signal ER from a line 144 to provide a generally continuous first switch control signal GC1, for example, to implement a low dropout (LDO) power converter topology (e.g., FIG. 5 below). In the first control mode "L", the second switch 136 connects the second driver circuit input line 135 to a circuit ground or other constant voltage node in order to turn off the low side transistor M2. For example, the high side transistor M1 can be operated in a generally linear mode to provide an output voltage at the switch node 112 to regulate the output voltage according to a sensed output voltage feedback signal FB and a reference signal REF.

In a second control mode, the configuration circuit 150 provides the MODE control signal to place the switches 126 and 136 in the indicated "S" position to connect the inputs of the driver circuits 122 and 134 to receive pulse width modulated (PWM) control signals respectively from lines 128 and 138 of a PWM control circuit 130. The PWM circuit 130 receives a compensated input signal "COMP" on line 140 from the output of an op amp 138. The control circuit 110 in one example also includes a current sense and compensation circuit 146 providing a current sense signal CS on a line 148, which is provided to the non-inverting input of the op amp 138. In the illustrated example, the current sense and compensation circuit 146 includes first and second current sense inputs 115 and 116 (CS1 and CS2) to sense a current signal via pads 105 and 106, respectively. For example, a current sense resistor (not shown in FIG. 1) can be connected in a current carrying path of a power converter, and the pads 105 and 106 are connected to opposite ends of the current sense resistor to provide a voltage signal as an input to the current sense and compensation circuit 146 representing the sensed current.

The inverting input of the op amp 138 is connected to receive the error signal ER on line 144 from the output of an error amplifier 142. The error signal ER is generated by the amplifier 142 to represent an error between the feedback signal FB provided on line 114 to the inverting input of the error amplifier 142, and the reference voltage signal REF provided on a line 117 to the positive input of the amplifier 142. In one example, the reference signal REF is received via a pad 107 of the IC 100 from an external source (e.g., a bandgap reference, etc., not shown). In another example, the REF signal is generated internal to the IC 100, and the pad 107 can be omitted. The feedback signal FB is received from a feedback pad 104, for example, to represent an output voltage or other regulated signal of a power converter that includes the IC 100 and other external circuit components. As further described below in connection with FIG. 2, the feedback signal FB is also provided as an input to the configuration circuit 150 in certain examples.

In operation in the switching mode "S" (e.g., FIGS. 3 and 4 below), the error amplifier 142 generates the error signal ER representing the error between a desired output level indicated by the REF signal, and an output voltage of the power converter, represented by the feedback signal FB. The error signal ER in one example is compensated by a sensed current (e.g., a buck or boost converter inductor current) via the compensation amplifier 138, and the PWM circuit 130 provides alternating pulse width modulated control signals via the PWM circuit outputs 128 and 138 to operate the high and low side switches M1 and M2 via the driver circuits 122 and 134, respectively.

In certain examples, the configuration circuit 150 is also operative to provide the mode control signal MODE to set the control circuit 110 in a third control mode to implement a hot-swap power converter (designated "H-S" in the switch 136 of FIG. 1). In the third control mode, the current sense and compensation circuit 146 provides the input signal CS from line 148 to the input of the first driver circuit 122 through the first switch 126. For example, a supply current can be sensed via the current sense and compensation circuit 146 of the IC 100, and the sensed current is used as a drive control signal to control M1 to allow supply current to flow in a hot-swap converter.

Figure 2:
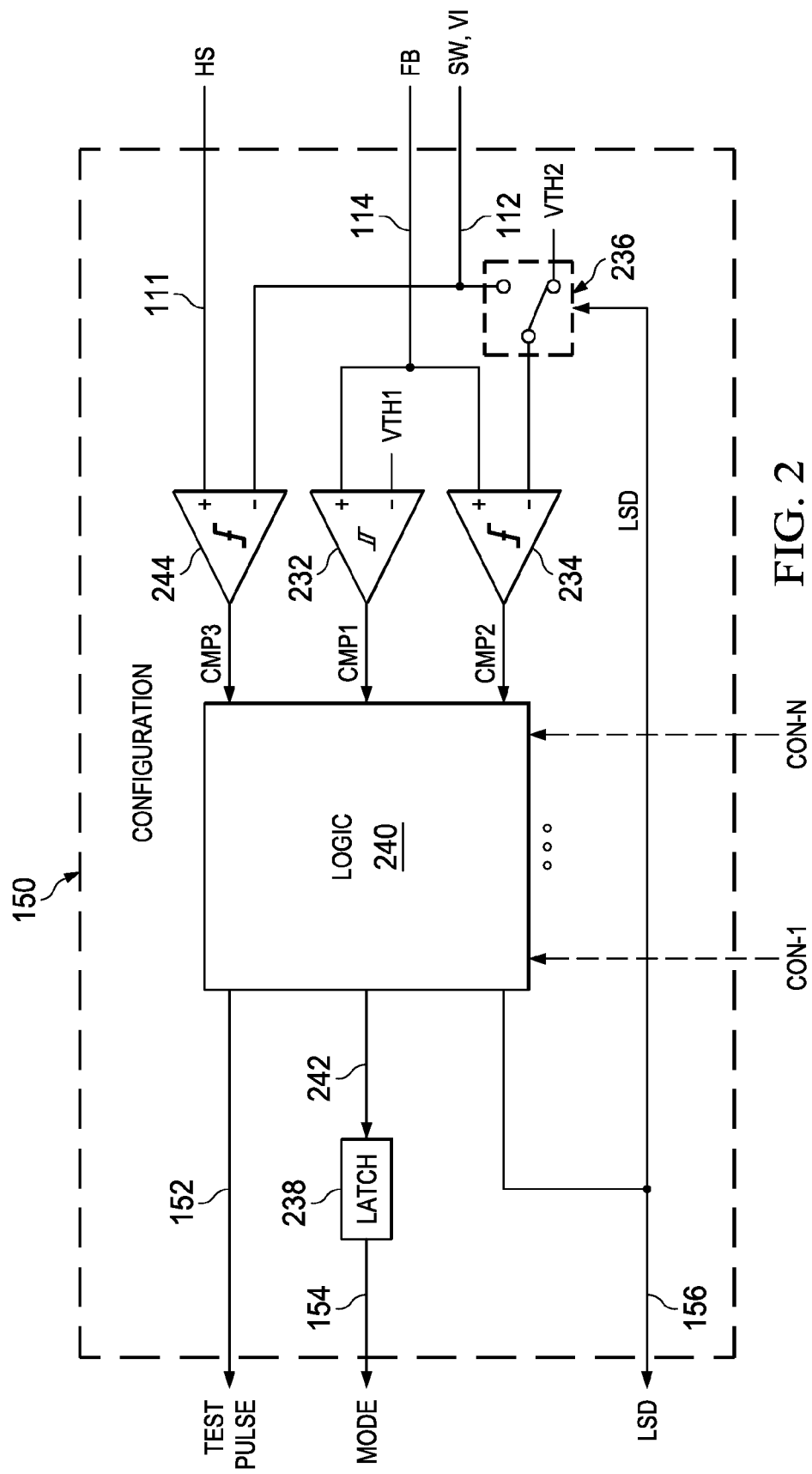
FIG. 2 shows an example configuration circuit in the IC of FIG. 1.

FIG. 2 shows an example configuration circuit 150 in the IC 100, including input connections to the lines 111, 112 and 114, as well as optional connections to the configuration inputs from the pads 108 in FIG. 1. The configuration circuit 150 also includes signal output lines 152, 154 and 156 to provide configuration and control signaling to the control circuit 110. The configuration circuit 150 includes a logic circuit 240 operative in one example to provide the TEST PULSE signal on the line 152, and to provide the LSD signal on the line 156, as well as providing a signal to a latch circuit 238 on a line 242 in order to sense whether an inductor is connected to one of the pads 102 or 104 connected to the lines 112 and 114 in the IC 100 of FIG. 1. In this example, the logic circuit 140 selectively provides the mode control signal MODE (e.g., a single binary signal, or multiple binary signals in certain examples) to set the control circuit 110 in a test mode T while the configuration circuit 150 senses the circuit condition of the IC 100.

The configuration circuit 150 also includes a first comparator 232, which can be a hysteresis comparator that compares the feedback signal FB from the line 114 to a first threshold voltage VTH1 to generate a first comparator signal CMP1. A second comparator 234 compares the feedback signal FB from the line 114 with a signal provided from a third switch 236 according to the LSD signal from the line 156. In one state, the switch 236 provides the switch node signal SW from the line 112 to the input of the second comparator 234. In another state, the switched 236 provides a second threshold voltage VH2 to the negative input of the second comparator 234. The comparator 234 provides a second comparator signal CMP2 to the logic circuit 240. The logic circuit 240 in one example operates according to the methods described in U.S. Pat. No. 8,040,116. The logic circuit 240 provides signals on the lines 152 and 156 in the test mode, receives the comparator signals CMP1 and CMP2 to sense the circuit condition of the IC 100, and provides the signal to the latch 238. The latch 238 provides the mode control signal MODE on the line 154. In certain examples, multiple latches 238 can be used, for example, to provide a multi-bit mode control signal MODE to the control circuit 110.

The circuit condition of the IC 100 includes interconnection of external circuit components with the various IC pads, in particular pads 101, 102 and/or 103 to define a power converter topology using the transistors M1 and M2 as shown in FIG. 1. For a given external circuit interconnection, the configuration circuit 150 performs automatic circuit condition detection, for example, upon application of power to the IC 100. In certain configurations, the external circuitry includes an inductor with an output capacitor, for example, to implement a buck or boost type switching power converter topology. In another example, the external circuitry includes an output capacitor with no inductor, for example, for a low dropout regulator or a hot-swap power converter topology. In the former case, the configuration circuit 150 will provide the mode control signal MODE to set the control circuit 110 to provide one or both of the switch control signals GC1 and/or GC2 using pulse width modulation techniques. In the latter case, the configuration circuit 150 will provide the mode control signal MODE to set the control circuit 110 to provide one or both of the signals GC1 and/or GC2 in a generally continuous fashion for linear control of an output voltage or other power converter signal.

When power is provided to the IC 100, the flyback period has occurred. A flyback period occurs if a negative voltage occurs at the output node represented by the feedback signal FB from the pad 104, due to the presence of an inductor connected to the switch node 112 via the pad 102. This results from a connected inductor drawing current through a body diode of the low side switch M2 upon the high side transistor M1 being turned off. A flyback period does not occur if a negative voltage does not occur at the output node due the lack of presence of an inductor when the IC 100 and the external circuitry is configured as an LDO regulator or hot-swap converter topology. The logic circuit 240 provides a signal to the latch 238 based on the determination of whether or not a flyback period occurs. Thereafter, the logic circuit 240 provides the mode control signal MODE to set the control circuit 110 to the corresponding control mode.

By these techniques, the configuration circuit 150 determines whether an external inductor is connected to the IC 150, and if so sets the control circuit 110 to the second control mode to operate a switching power converter topology, such as a buck converter or a boost converter, or a buck-boost converter, cuk converter, etc. In certain examples, the configuration circuit 150 also includes a third comparator 244 which compares the high side and switch node signals HS and SW from the lines 111 and 112 to provide a third comparator output signal CMP3 to the logic circuit 240. The negative terminal of the comparator 244 in another example is connected to an input voltage VI at a terminal of the external inductor L. For operation in the second control mode, the logic circuit 240 in this example determines whether the voltage at the high side node 111 is greater than or less than the voltage of the switch node 112, and accordingly implements a buck converter or a boost converter based on this further sensed circuit condition of the IC 100. In particular, when the comparator signal CMP3 indicates the output voltage of the power converter is less than the input voltage, the logic circuit 240 provides a signal to the latch 238 to set the control circuit 110 in the second control mode to provide the signal GC1 as a high side control signal, and to provide the signal GC2 as a low side control signal to implement a buck converter. If the signal CMP3 instead indicates that the output voltage of the power converter is greater than the input voltage, the logic circuit 240 sets the control circuit 110 in the second control mode to provide the signal GC1 as a low side control signal, and to provide the signal GC2 as a high side control signal to implement a boost converter.

If the logic circuit 240 instead concludes that no inductor is connected based on this sensed circuit condition, the logic circuit instead sets the control circuit 110 to the first control mode to implement an LDO power converter topology, or to the third control mode to implement a hot-swap power converter topology. In the first control mode, the logic circuit 240 sets the control circuit 110 to implement a low dropout LDO power converter to provide the first switch control signal GC1 in a generally continuous fashion according to a feedback signal FB and a reference signal REF via the error amplifier 142 in FIG. 1. In the third mode, the configuration circuit 150 sets the control circuit 110 to implement a hot-swap power converter to provide the first switch control signal GC1 in a generally continuous fashion according to a sensed current signal CS from the current sense and compensation circuit 146.

Referring now to FIG. 1 and FIGS. 3-6, several examples of different power converter topology configurations are illustrated. These examples are not exhaustive of all the possible interconnections that can be implemented using the configurable converter control IC 100.

Figure 3:
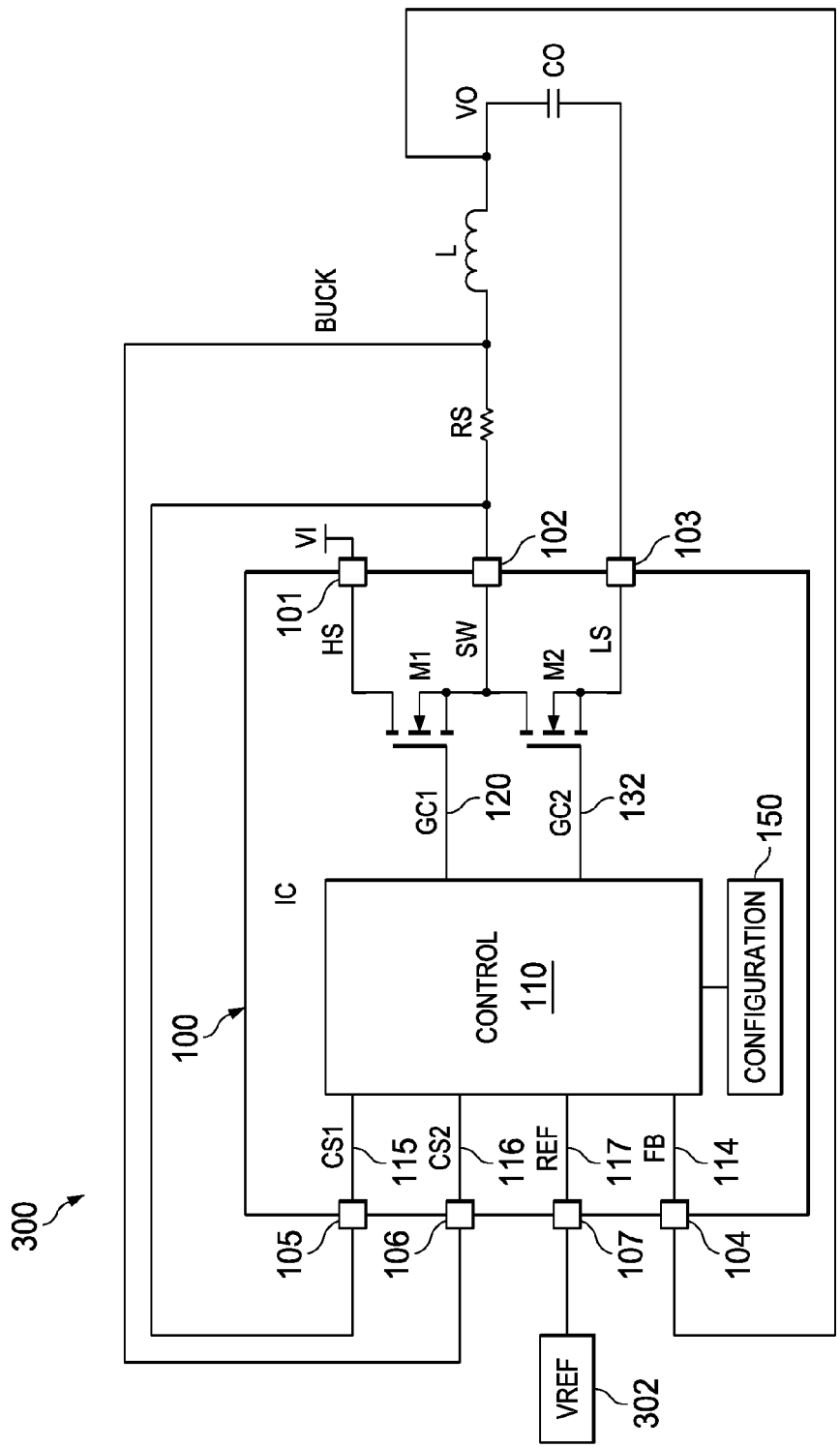
FIG. 3 shows the IC of FIG. 1 in a buck power converter topology.

FIG. 3 shows the IC 100 in a buck power converter topology 300, with an input voltage VI connected to the pad 101, an inductor L and a current sense resistor RS connected in series between the switch node pad 102 and a circuit output to provide an output voltage VO. An output capacitor CO is connected between the output voltage node and the low side pad 103. In this example, the control circuit 101 provides pulse width modulated switching control signals to operate M1 and M2 to implement a buck converter. The current sense pads 105 and 106 are connected across the sense resistor RS to provide a current sense signal CS to the compensation amplifier 138 (FIG. 1). The output voltage node is connected to provide the feedback signal FB at the pad 104. In other possible implementations, the sense resistor RS can be omitted. The configuration circuit 150 in this example provides the mode control signal MODE to place the switches 126 and 136 in the "S" positions. The error amplifier 142 in FIG. 1 provides the error signal ER as the difference between the output voltage (FB signal) and the REF signal. In FIG. 3, an external voltage reference circuit 302 (designated "VREF") delivers the REF signal to the pad 107. In other examples, the error amplifier 142 operates according to an internally generated REF signal.

Figure 4:
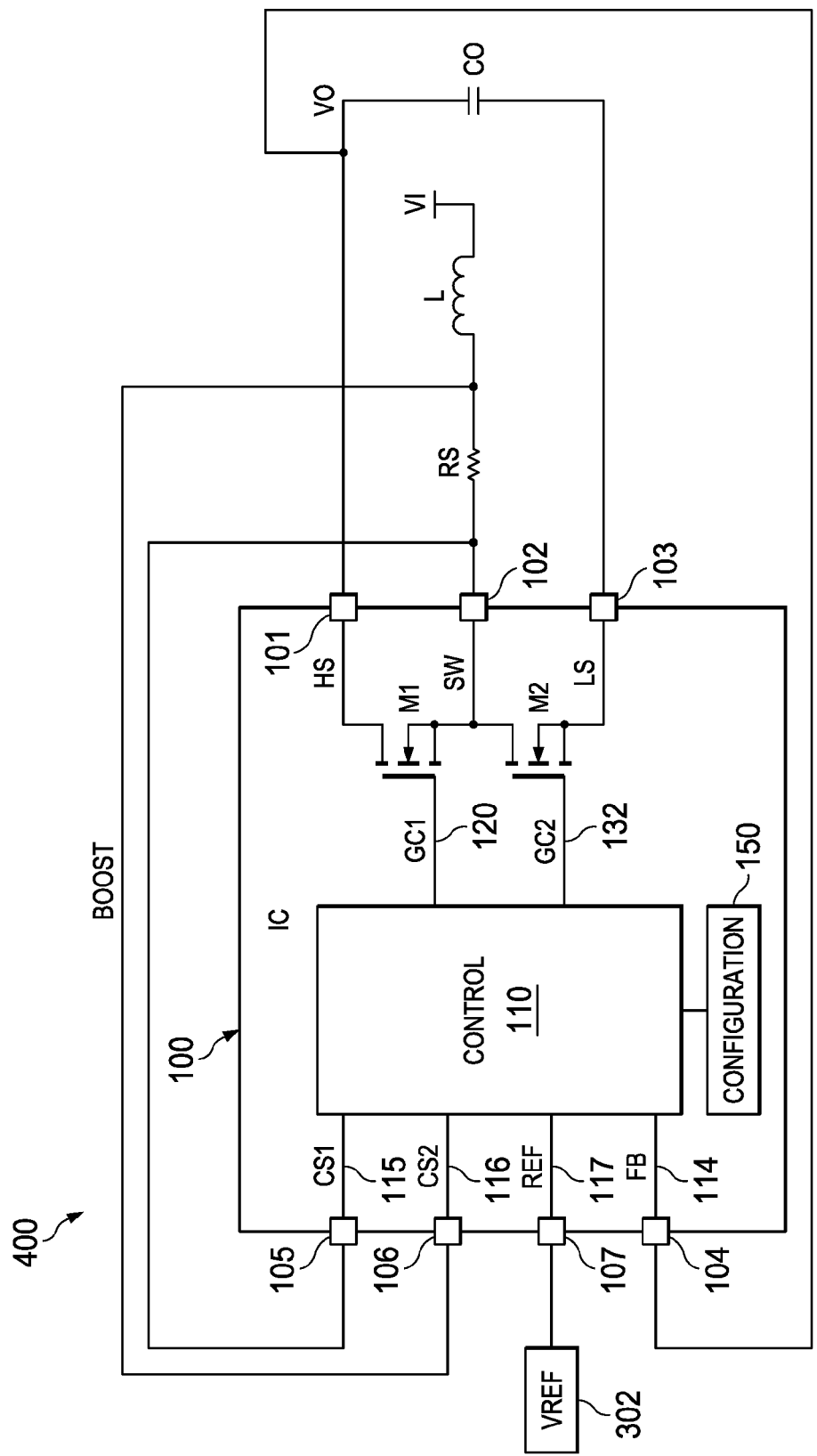
FIG. 4 shows the IC of FIG. 1 in a boost power converter topology.

FIG. 4 shows the IC 100 of FIG. 1 in a boost power converter topology 400. In this example, the high side switch pad 101 is connected to provide the output voltage VO, and the output capacitor CO is connected between the high side pad 101 and the low side pad 103. The sense resistor RS and the output inductor L are connected in series between the switch node pad 102 and the input voltage VI. The configuration circuit 150 in this example places the switches 126 and 136 in the "S" position for switching power converter operation, and the PWM circuit 130 provides pulse width modulated control signals through the drivers 122 and 134 to operate the high and low side switches M1 and M2 to implement a boost converter topology. The sensed current signal obtained via the resistor RS and the pads 105, 106 can be used in certain implementations for current compensated control by the control circuit 110.

Figure 5:
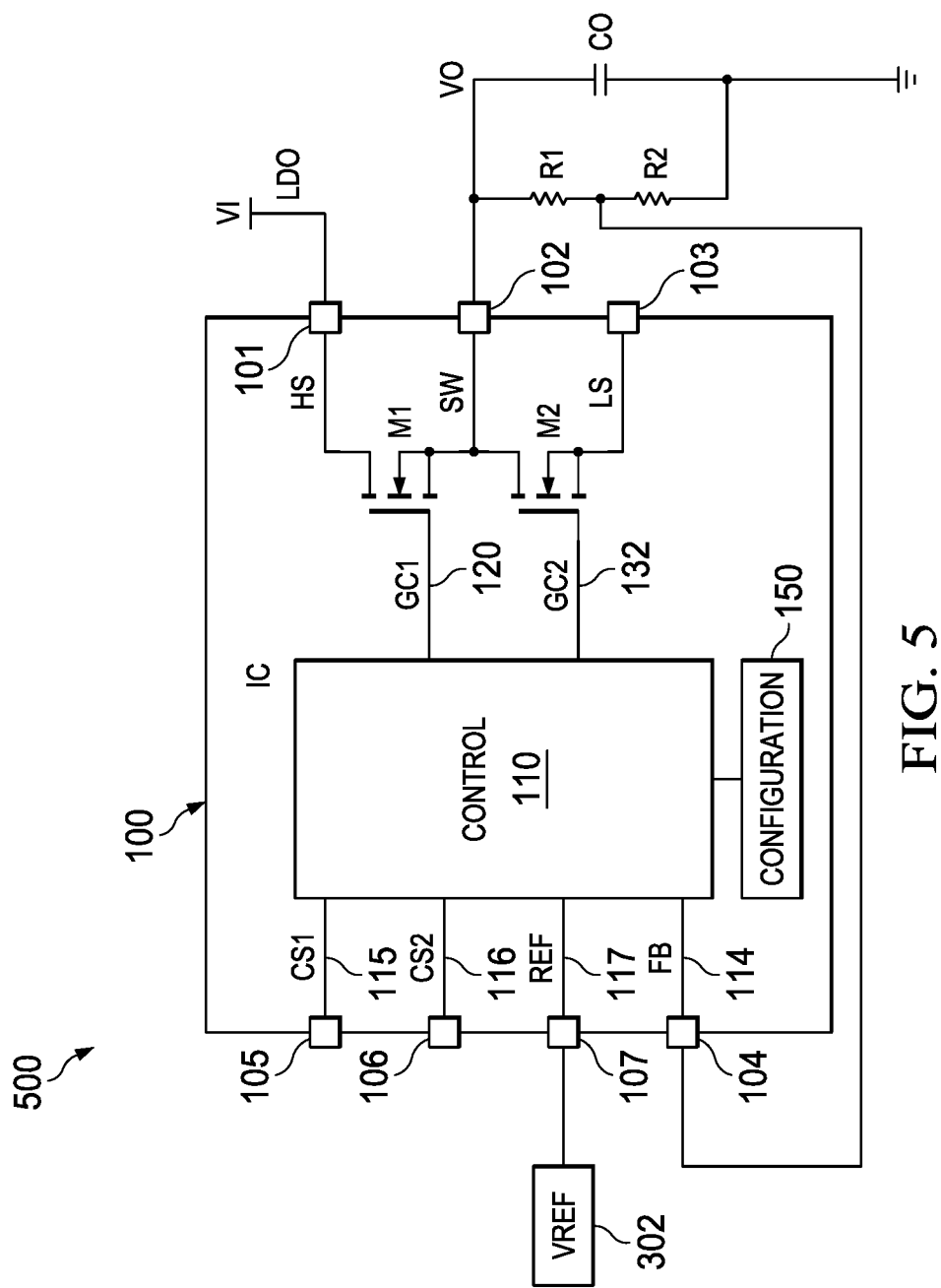
FIG. 5 shows the IC of FIG. 1 in a low dropout (LDO) regulator power converter topology.

FIG. 5 shows the IC 100 in a low dropout (LDO) regulator power converter topology 500. In this example, the high side switch M1 is connected between the input voltage VI and the output voltage VO, with an output capacitor CO connected between the output voltage and a circuit ground. A resistive divider circuit is created by resistors R1 and R2 connected in series with one another across the output capacitor CO. A connecting node of the resistors R1 and R2 is connected to the feedback pad 104 to provide the FB signal to the control circuit 110. In this example, the configuration circuit 150 detects in the test mode that no inductor is connected to the IC pads 101, 102. The configuration circuit 150 provides the mode control signal MODE to set the control circuit 110 to the first control mode, and places the switches 126 and 136 to the "L" position. In this configuration, the low side transistor M2 is turned off through connection of the input to the second driver circuit 134 to the circuit ground, and the high side transistor M1 is controlled according to the error signal ER on the line 144. The ER signal switch control signal GC1 in a generally continuous fashion to form a regulated control loop to control the output voltage VO according to the REF signal.

Figure 6:
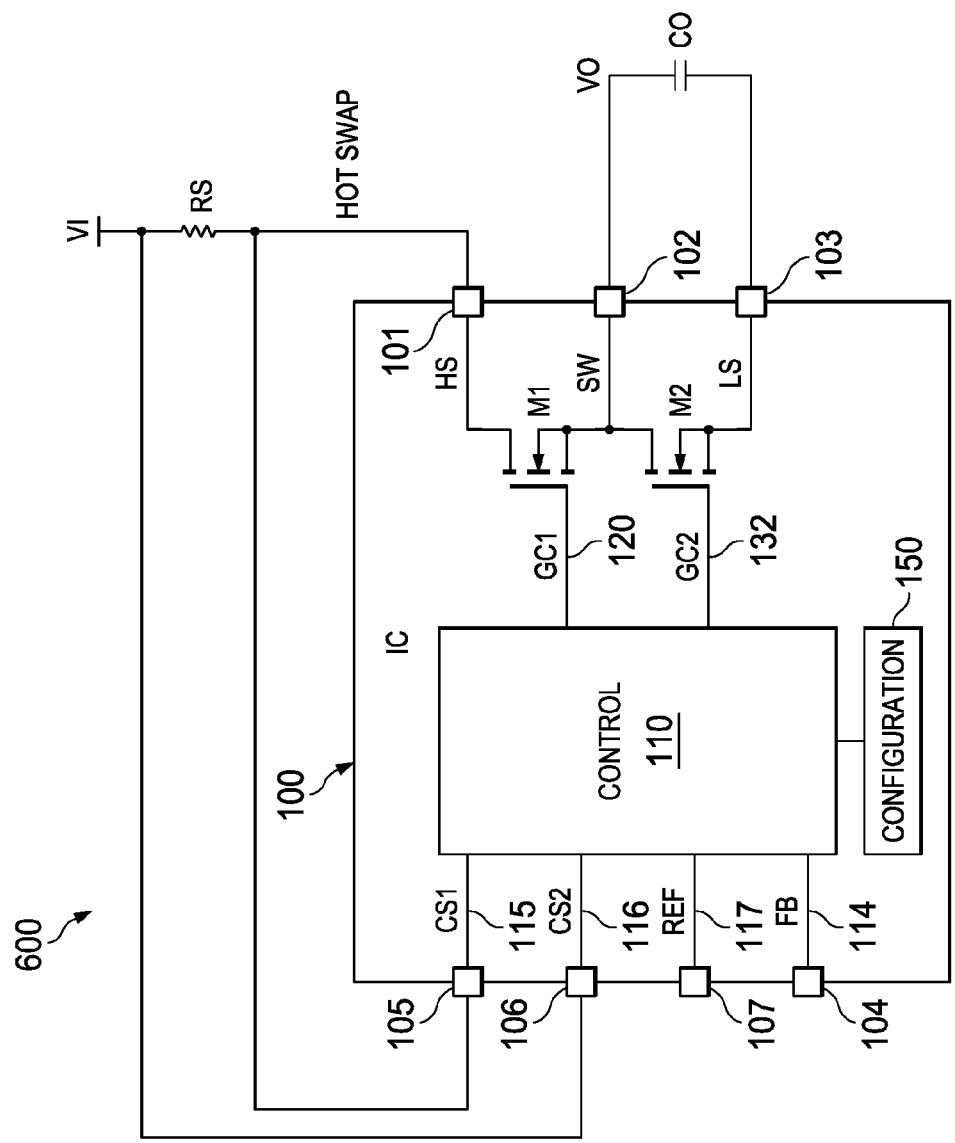
FIG. 6 shows the IC of FIG. 1 in a hot-swap power converter topology.

FIG. 6 shows the IC 100 in a hot-swap power converter topology 600. In this example, the hot-swap converter 600 can be used to control current flow between a power source and a load circuit to facilitate hot plugging or hot swapping for connection and disconnection of the load to or from the power source. The illustrated example, moreover, uses current sensing through a sense resistor RS connected to the current sense pads 105 and 106. In this example, the configuration circuit 150 detects that no inductor is connected to the pads 101, 102, provides the mode control signal MODE to set the control circuit 110 to the third control mode, and places the switches 126 and 136 in the H-S positions. This turns off the transistor M2, and operates the high side transistor M1 according to the current sense output from the circuit 146 in FIG. 1. In this topology, M1 controls the inrush current to ensure a safe power up, for instance, to allow controlled charging of the output capacitor CO and any capacitance of the connected load. The transistor M2 operates according to a generally continuous switch control signal GC1 provided by the current sensing compensation circuit 146. This topology allows the IC 100 to monitor supply current via the sense resistor RS after power up for protection against short-circuits or other overcurrent conditions during normal operation.

Referring now to FIGS. 1, 2 and 7-17, FIG. 7 shows another IC example 700 including two half bridge switch circuits 109 and 109B, each including a half bridge configuration of two transistors, as well as a configurable control circuit 110 and a configuration circuit 150 generally as described above. Switch circuit 109 includes transistors M1 and M2 forming a half bridge circuit connected to the lines 111-113 and the corresponding pads 101-103 for operation according to first and second switch control signals GC1 and GC2 provided via corresponding drivers 122 (DRV-1) and 134 (DRV-2) of the control circuit 110 as described above. In addition, the second switch circuit 109B includes a third transistor M3 and a fourth transistor M4 configured in a second half bridge circuit with corresponding connections to a second high side line 111B (HS2) with pad 101B, a second switch node line 112B (SW2) with pad 102B, and a second low side line 113B (LS2) with pad 103B. The control circuit 110 includes suitable circuitry, with configuration switching as described above in connection with FIG. 1 for operating the first switch circuit as described above. In addition, the control circuit 110 in FIG. 7 includes suitable circuitry that is configurable to operate the second switch circuit 109B by providing a third switch control signal GC3 from a third driver 122B (DRV-3) on line 120B, and a fourth switch control signal GC4 from a fourth driver 134B (DRV-4) on line 132B. In this example, moreover, the IC 100 includes a first feedback pad 104 and corresponding line 114 to provide a first feedback signal FB as described above, as well as a second feedback pad 104B and line 114B providing a second feedback signal 1B2 to the configuration circuit 150 and to the control circuit 110.

Figure 7:
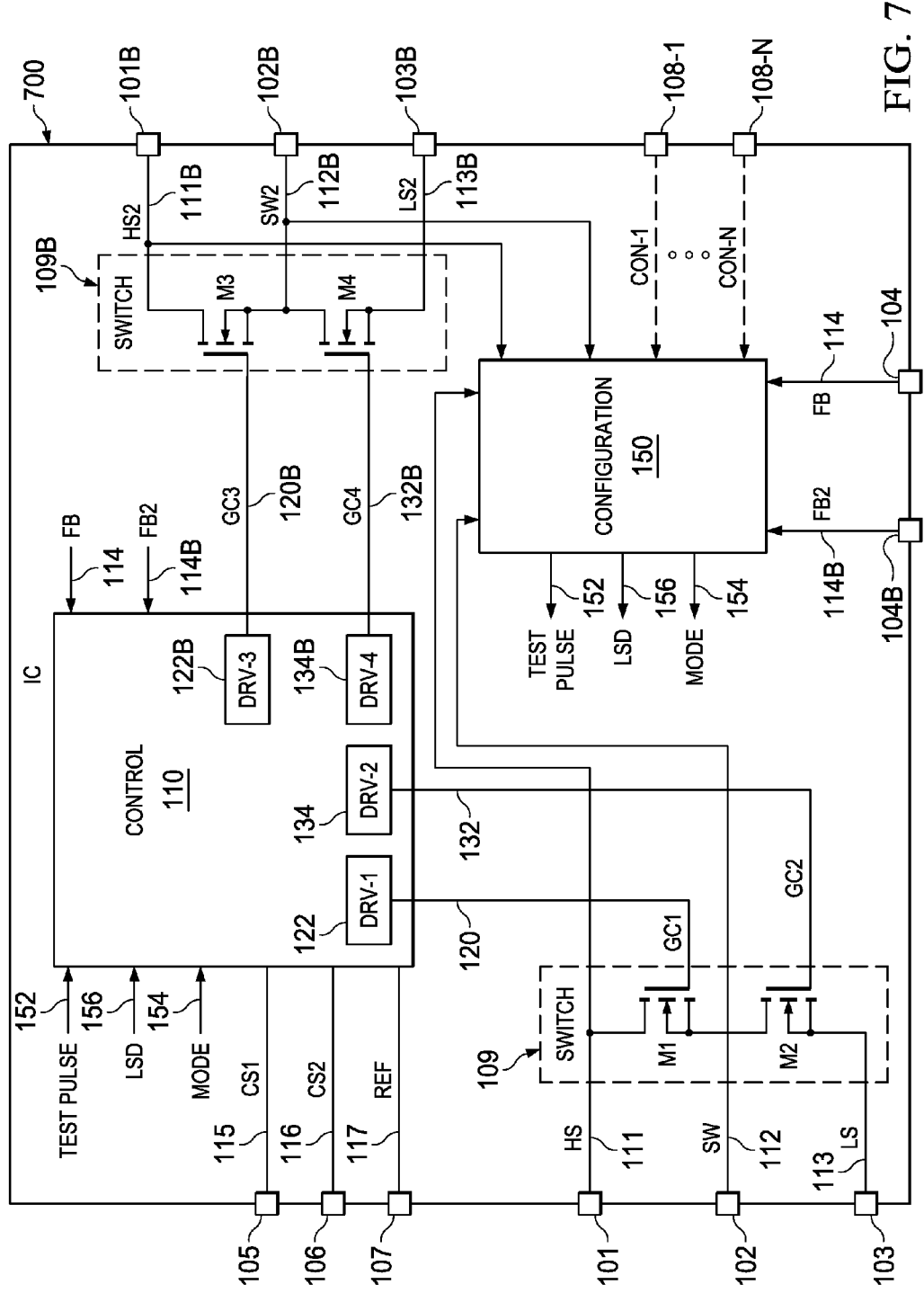
FIG. 7 shows another IC example including two half bridge switch circuits, a configurable controller and a configuration circuit.

The configurable control circuit 110 and the configuration circuit 150 in the example of FIG. 7 operate generally as described above in connection with FIGS. 1 and 2. The provision of two H-Bridge circuits and corresponding pads and control capabilities allows a wide variety of different implementations to provide various power converter topologies, including those described above, as well as H-Bridge topologies, buck-boost topologies, etc. Moreover, the configuration circuit 150 provides various determination capabilities as described above in order to provide the mode control signal MODE to set the control circuit 110 in a test mode for circuit condition determination, and/or in one of a plurality of different control modes to operate the switches of the first and second switch circuits 109, 109B. In certain examples, moreover, the configuration circuit 150 determines the circuit condition of one or more configuration pads 108 as described above, which can be used alone or in combination with the above-described circuit condition determination characteristics using test pulses. In this regard, the control circuit 110 is configured to one of a plurality of modes in certain examples by connection of at least one configuration pad 108 of the IC 700 to a predetermined voltage level or a ground connection.

Based on the sensed circuit condition of the IC 700, the configuration circuit 150 provides the mode control signal MODE on the line or lines 154 to configure the control circuit 110 for operation in one of a plurality of modes in accordance with the sensed circuit condition. In particular, the control circuit 110 selectively operates one or more of the switch circuits 109, 109B in one of a plurality of modes T, L, S, H-S to provide switching control signals GC to at least one of the transistors M1-M4 in a generally continuous fashion to implement a low dropout LDO or hot-swap HS power converter, or to provide the switching control signals GC using pulse width modulation to implement a switching power converter. Furthermore, the control circuit 110 can operate one of the switch circuits 109, 109B in generally continuous fashion and operate the other as a switched power converter topology using PWM control signals GC.

In certain examples, the configuration circuit 150 can detect the presence or absence of an inductor in a first external circuit connected to the switch circuit 109, and can also detect the presence or absence of an inductor in a second external circuit connected to the second switch circuit 109B. The configuration circuit 150 provides the mode control signal MODE to accordingly set the control circuit 110 to operate each individual switch circuit 109, 109B in a corresponding control mode. In other examples, a single external circuit can be connected to both switch circuits 109, 109B to implement various power converter topologies that utilize switches of both circuits 109, 109B. For example, the logic circuit 240 (FIG. 2) in the configuration circuit 150 of FIG. 7 in one example is operative according to the sensed circuit condition to provide at least one of the first and second switch control signals GC1, GC2 using pulse width modulation to implement one of a first buck converter and a first boost converter; and to provide at least one of the third and fourth switch control signals GC3, GC4 using pulse width modulation to implement one of a second buck converter and a second boost converter. This allows, for example, dual buck converter topologies, buck-boost topologies, dual boost converter topologies, and a variety of other combinations of switching topologies and/or non-switching (e.g., LDO, hot-swap, etc.) topologies.

FIGS. 8-17 illustrate the dual half bridge IC example 700 configured in a variety of different power converter topologies, which are not limiting with respect to the number of different configurations that are possible using the IC 700.

Figure 8:
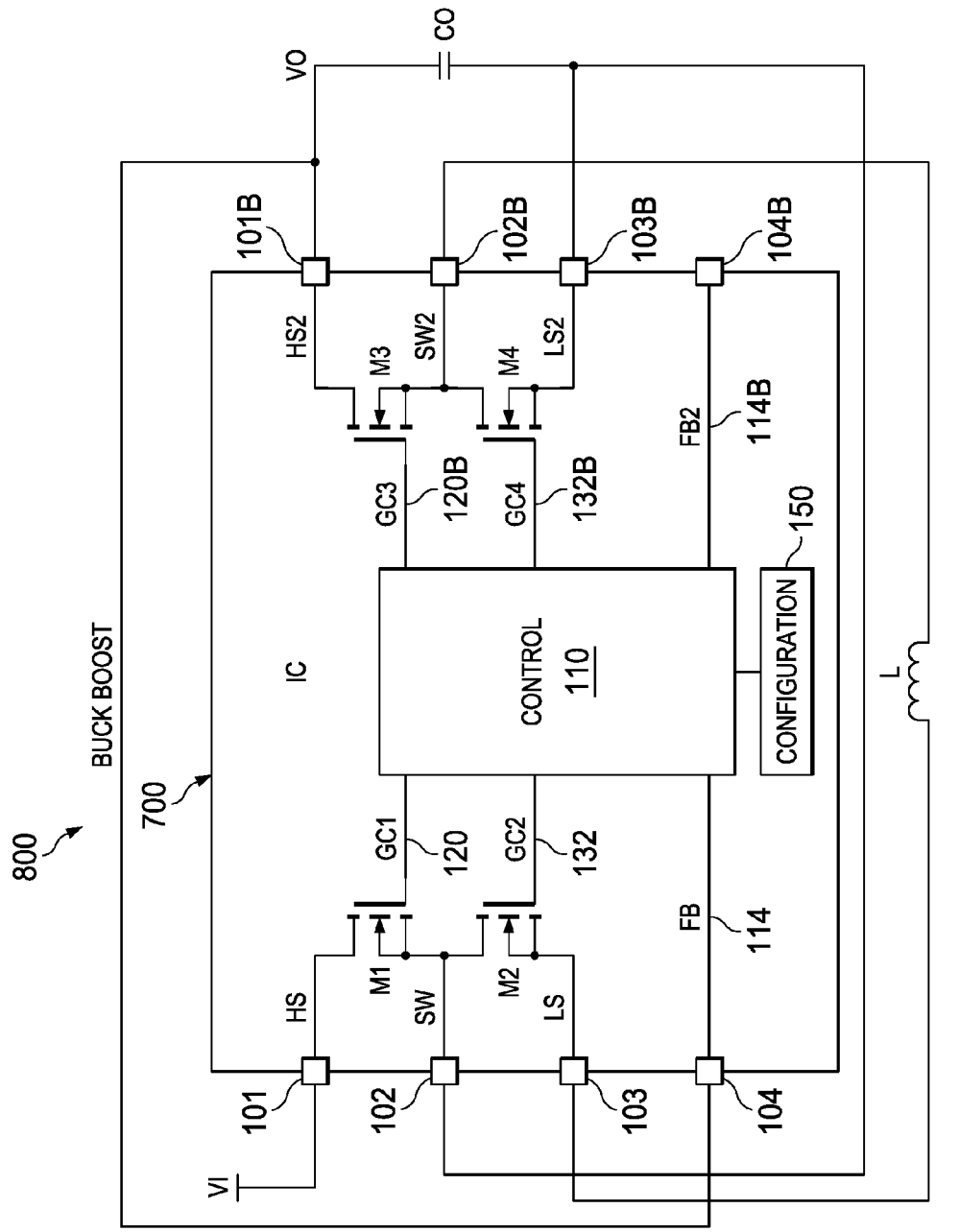
FIG. 8 shows the IC of FIG. 7 in a buck boost power converter topology.

FIG. 8 shows the IC 700 of FIG. 7 in a buck-boost power converter topology 800. In this example, a converter inductor L is connected between the switch node pads 102 and 102B, and the first high side transistor M1 is connected to the input voltage VI. The low side pad 103 of the first switch circuit is connected to the low side pad 103B of the second switch circuit. An output voltage VO is provided at the high side pad 101B of the second switch circuit, and this node is connected to the feedback pad 104 to provide the FB signal to the control circuit 110 for closed loop regulation of the output voltage VO. In this example, M1 and M2 selectively connect the first side of the inductor L to the input voltage VI or to the output ground connection, and the second switch circuit transistors M3 and M4 selectively connect the other side of the inductor L to the output node at pad 101B or to the output reference ground at pad 103B to implement a buck-boost converter.

Figure 9:
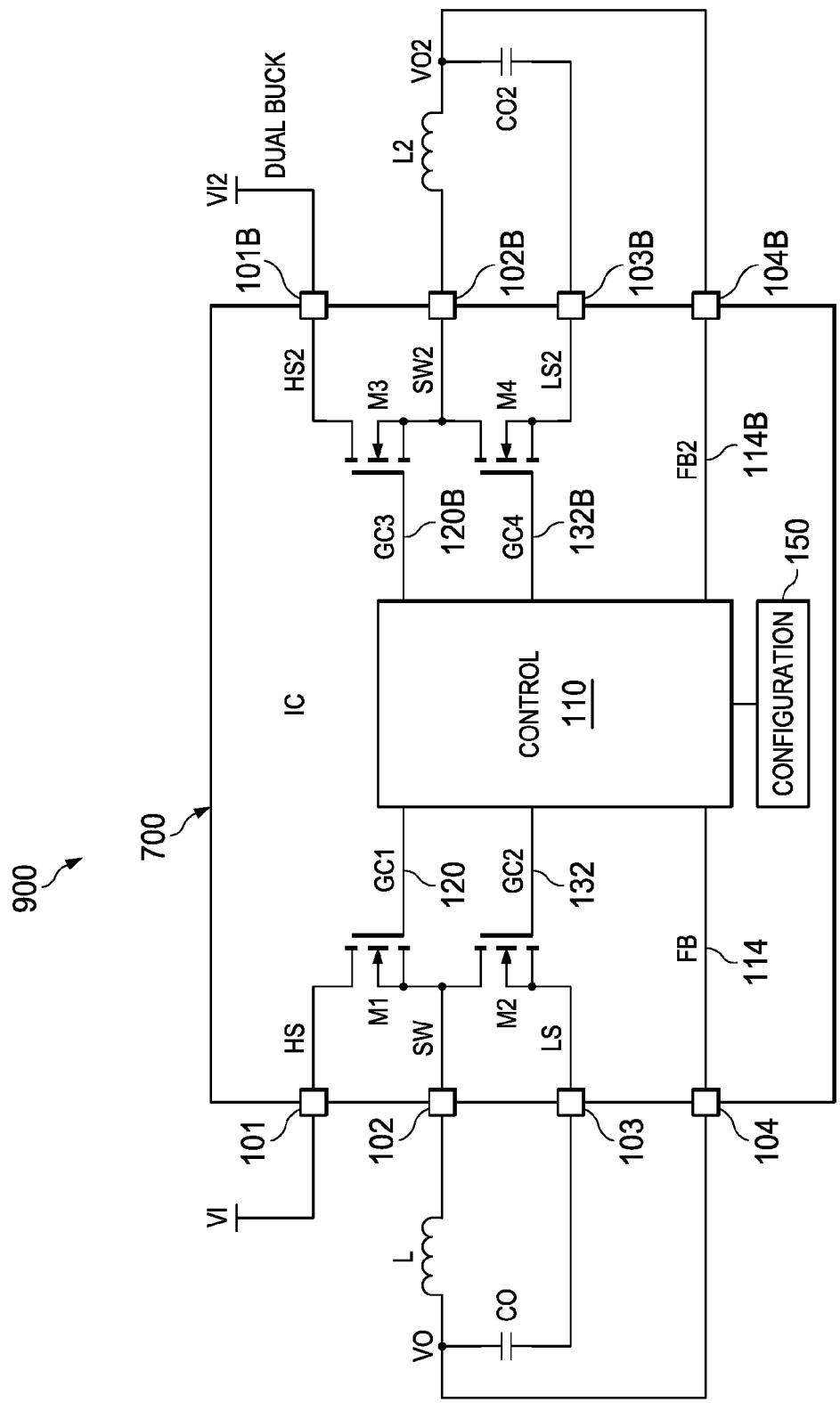
FIG. 9 shows the IC of FIG. 7 in a dual buck power converter topology.

FIG. 9 shows the IC 700 of FIG. 7 in a dual buck power converter topology 900, in which each switching circuit implements a separate buck converter. In this example, a first input voltage VI is connected to the first high side pad 101, and an inductor L is connected between the first switch node pad 102 and the first circuit output node to provide a first output voltage VO. A first output capacitor CO is connected between the output voltage node and the low side pad 103, and the output voltage VO is provided to the first feedback pad 104 to generate the first feedback signal FB. A second buck converter is implemented by connection of a second input voltage VI2 to the second high side pad 101B, with a second inductor L2 connected between the second switch node pad 102B and a second output node to provide a second output voltage VO2. A second output capacitor CO2 is connected between the second output node and the second low side pad 103B, and the second output voltage signal VO2 is provided to the second feedback pad 104B to provide a second feedback signal FB2 to the control circuit 110. The input voltages VI and VI2 are separate in one example. In other examples, a single input voltage (e.g., VI) can be connected to both input pads 101 and 101B.

Figure 10:
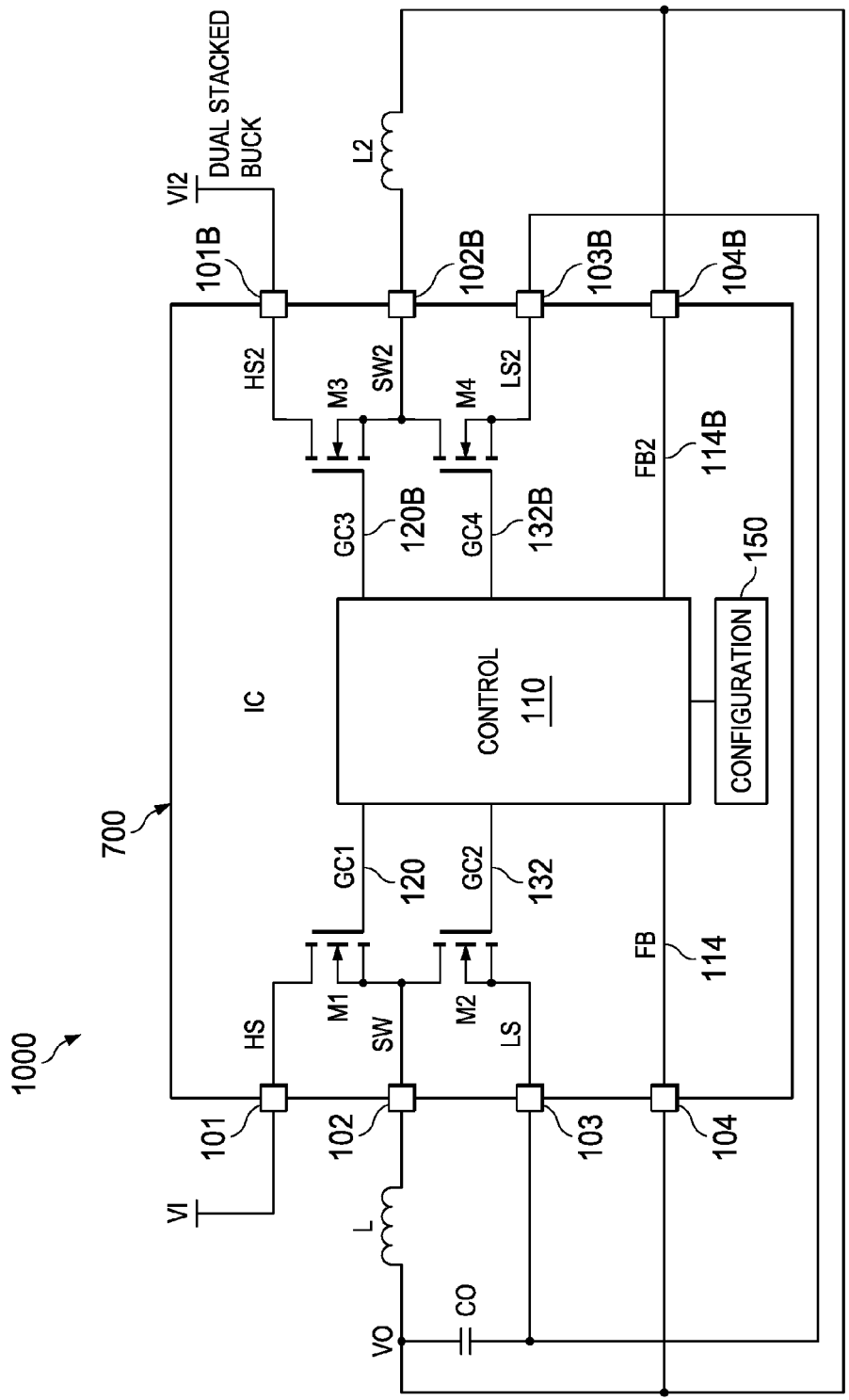
FIG. 10 shows the IC of FIG. 7 in a dual stacked buck power converter topology.

FIG. 10 shows the IC 700 in a dual stacked buck power converter topology 1000, configured in similar fashion to the separate dual buck topology 900 of FIG. 9. In the stacked dual buck configuration 1000 of FIG. 10, however, a single output capacitor CO is used to provide a single output voltage VO. The output voltage node is connected to both inductors L and L2, and also to the first and second feedback pads 104 and 104B. The low side pads 103 and 103B are also connected to one another and to the lower end of the output capacitor CO. Although two separate input voltages VI and VI2 are shown in FIG. 10, other configurations are possible in which a single input voltage (e.g., VI) is connected to both input pads 101 and 101B.

Figure 11:
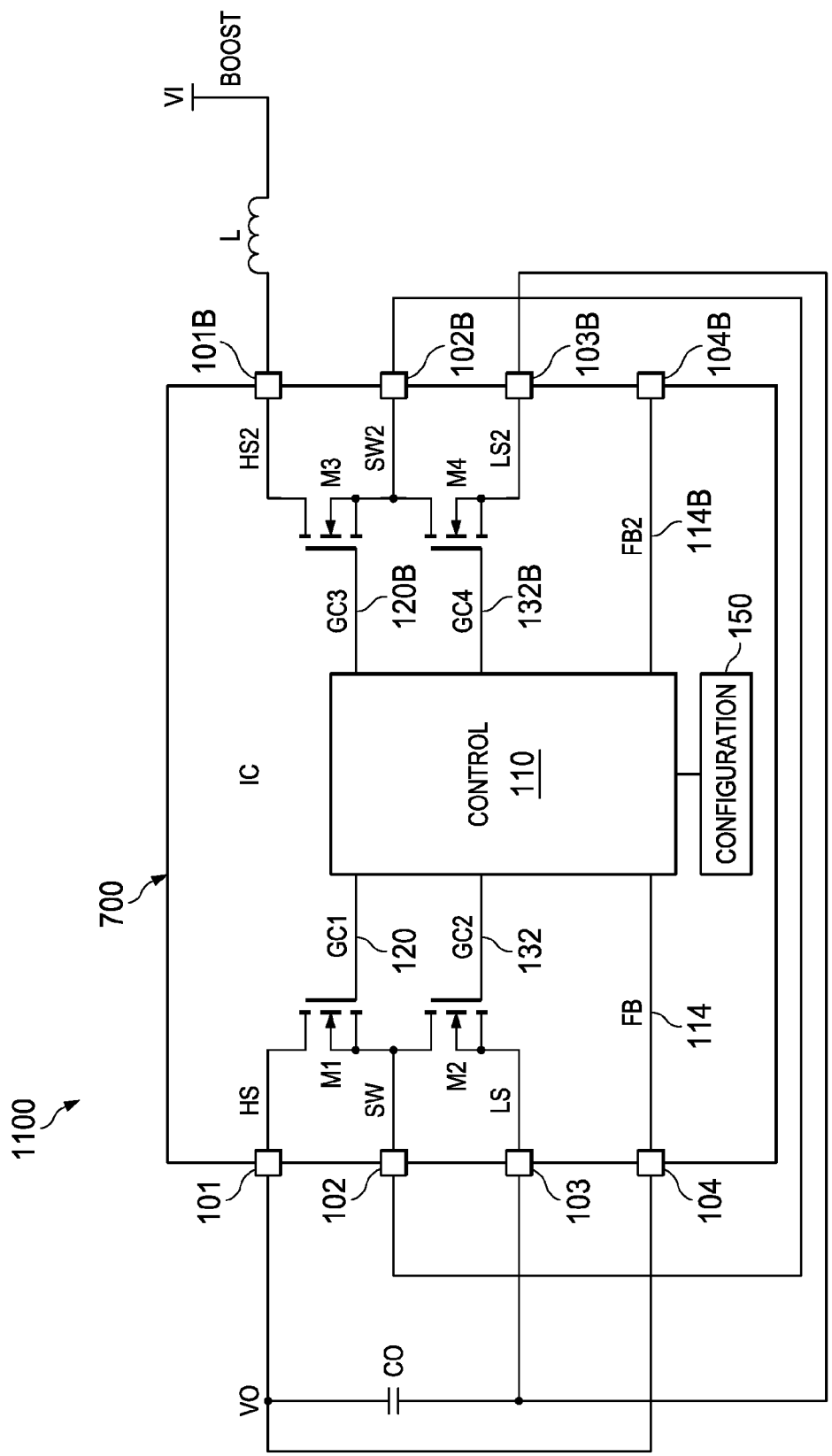
FIG. 11 shows the IC of FIG. 7 in a boost power converter topology.

FIG. 11 shows the IC 700 in a single boost power converter topology configuration 1100 to provide an output voltage VO across an output capacitor CO. In this example, an input voltage VI is connected through a converter inductor L to the second high side pad 101B, and the first high side pad 101 is connected to the output voltage node. The lower terminal of the output capacitor CO is connected to the first and second low side pads 103 and 103B, and the switch node pads 102 and 102B are connected to one another as shown. In this example, the transistor M1 operates as a high side switch of the boost converter configuration 1100, and M2 is turned off by the control circuit 110. The second low side transistor M4 is provided with a low side pulse width modulated switch control signal GC4 by the control circuit 110, and the transistor M3 is continuously turned on in normal operation to connect the switch node to the second high side pad 101B. This configuration also advantageously allows use of M3 by the control circuit 110 as a load disconnect switch, if desired.

Figure 12:
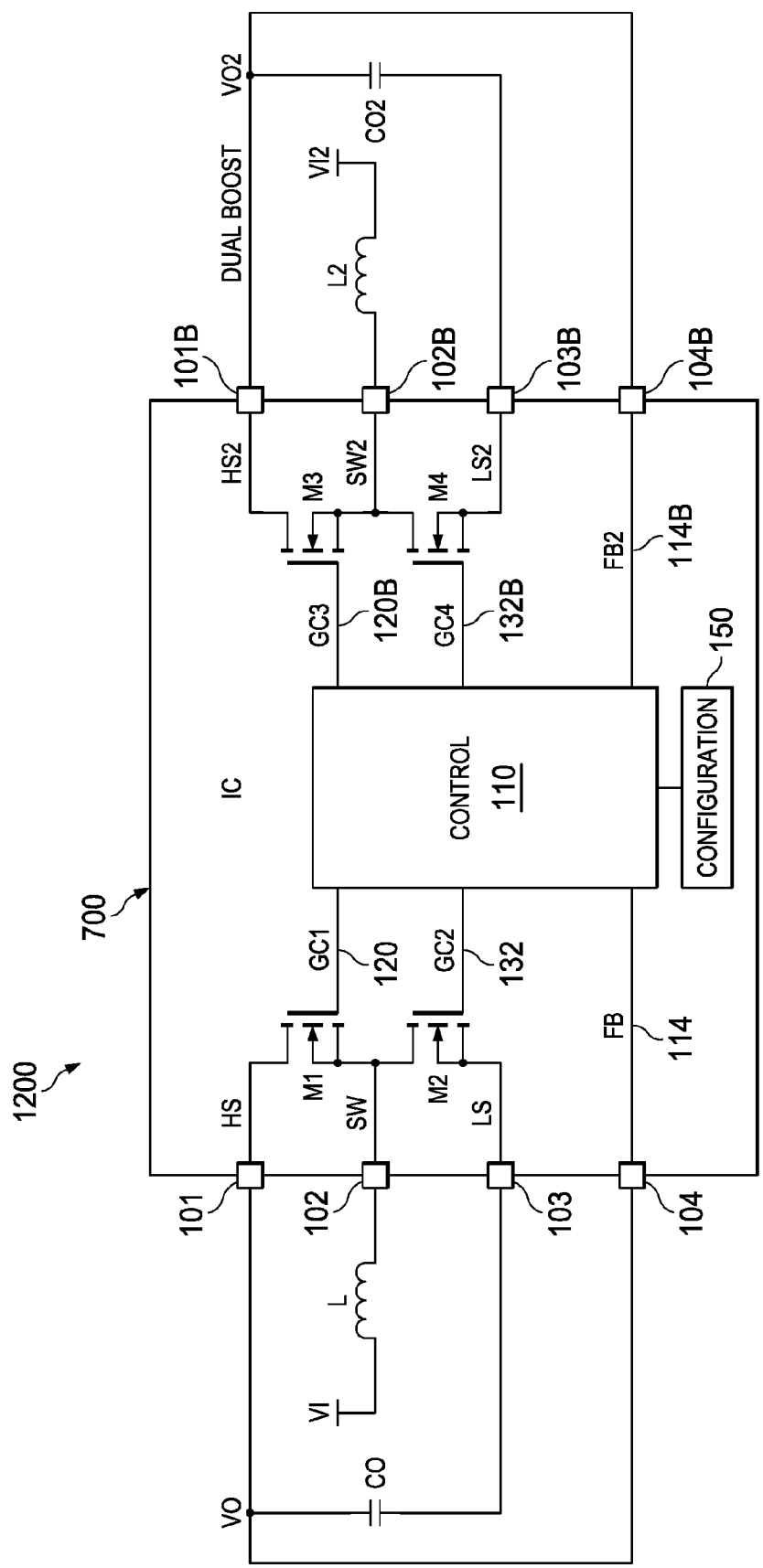
FIG. 12 shows the IC of FIG. 7 in a dual boost power converter topology.

FIG. 12 shows the IC 700 in a dual boost power converter topology 1200. In this configuration, each switch circuit is connected for operation as a separate boost converter. A first boost converter uses the first high side switch pad 101 to provide a first output voltage VO across a first output capacitor CO. The lower terminal of CO is connected to the first low side pad 103, and the first switch pad 102 is connected through an inductor L to the first input voltage VI. M1 operates as a first high side switch according to a PWM switch control signal GC1 from the control circuit. M2 is operated as a boost converter low side switch according to the PWM signal GC2 from the control circuit. A second boost converter is configured by connection of a second input voltage VI2 to a first end of a second inductor L2, and connection of a second end of L2 to the second switch node pad 102B. A second output voltage VO2 is provided to an upper terminal of a second output capacitor CO2, and the lower terminal of CO2 is connected to the second low side pad 103B. The first output voltage VO is provided as the feedback signal FB to the first feedback pad 104, and the second output voltage VO2 is provided as a second feedback signal FB2 to the second feedback pad 104B.

Figure 13:
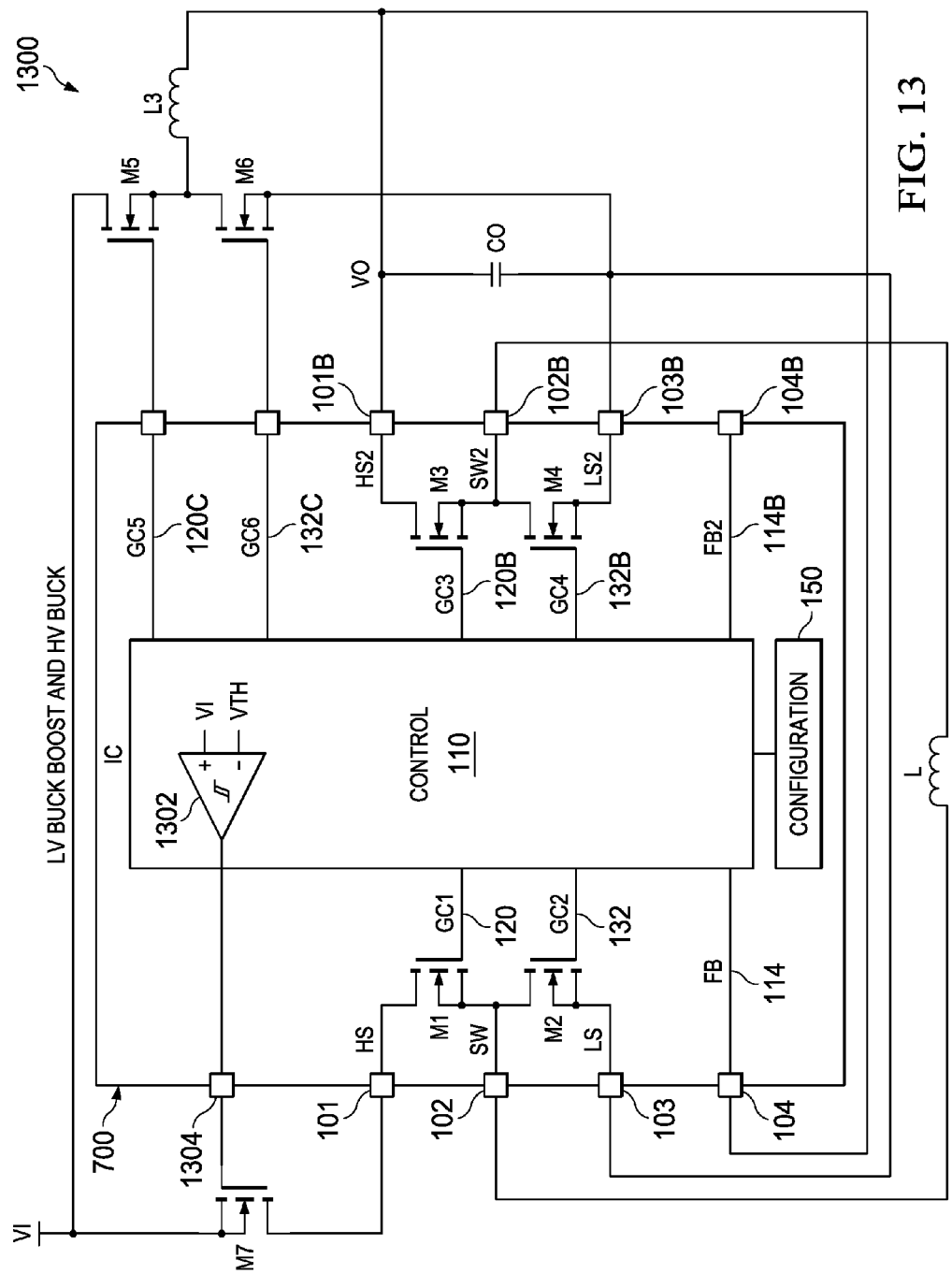
FIG. 13 shows another example of an IC with first and second half bridge switch circuits, a configuration circuit and a control circuit, configured to implement a low-voltage boost power converter topology in addition to a high voltage buck converter topology.

FIG. 13 shows another example of the IC 700 configured to implement a low-voltage boost power converter topology in addition to a high voltage buck converter topology. The IC 700 in this example includes first and second half bridge switch circuits (e.g., 109 and 109B as shown in FIG. 7), and a configuration circuit 150 as previously described. The control circuit 110 in the IC 700 of FIG. 13 operates as previously described, and also includes a further comparator 1302 with a positive input receiving the input voltage signal VI for comparison with a threshold voltage VTH. The output of the comparator 1302 is connected to a pad 1304 of the IC 700 to control a transistor M7. The input voltage VIN this topology is provided to a high voltage buck converter formed by external high and low side transistors M5 and M6, using an inductor L3. L3 is connected between the node joining M5 and M6, and an output voltage node providing an output voltage signal VO across an output capacitor CO.

M5 is operated according to a pulse width modulated fifth switch control signal GC5 provided by the control circuit 110 on a line 120C via a corresponding IC pad. The transistor M6 is operated as a low side high voltage buck switch according to a pulse width modulated sixth switch control signal GC6 provided on a line 132C from the control circuit 110 to the gate of M6. The first and second switch circuits and the transistors M1-M4 in this example are configured as a low-voltage buck-boost converter topology using an inductor L, similar to the example of FIG. 8 above. In addition, the comparator 1302 and the transistor M7 selectively connect or disconnect the input voltage VI to or from the buck-boost converter input at the first high side pad 101. In one example, the high-voltage buck converter implemented using the external transistors M5 and M6 operates to convert power from the input voltage VI (e.g., a battery in one example) to provide the output voltage VO regulated to about 5 V. If the battery voltage VI falls below 7 V in one example (e.g., VTH corresponds to about 7 V), the comparator 1302 turns the transistor M7 on, allowing the four-switch buck-boost controller implemented using M1-M4 to perform regulation of the output voltage VO according to the feedback signal FB.

Figure 14:
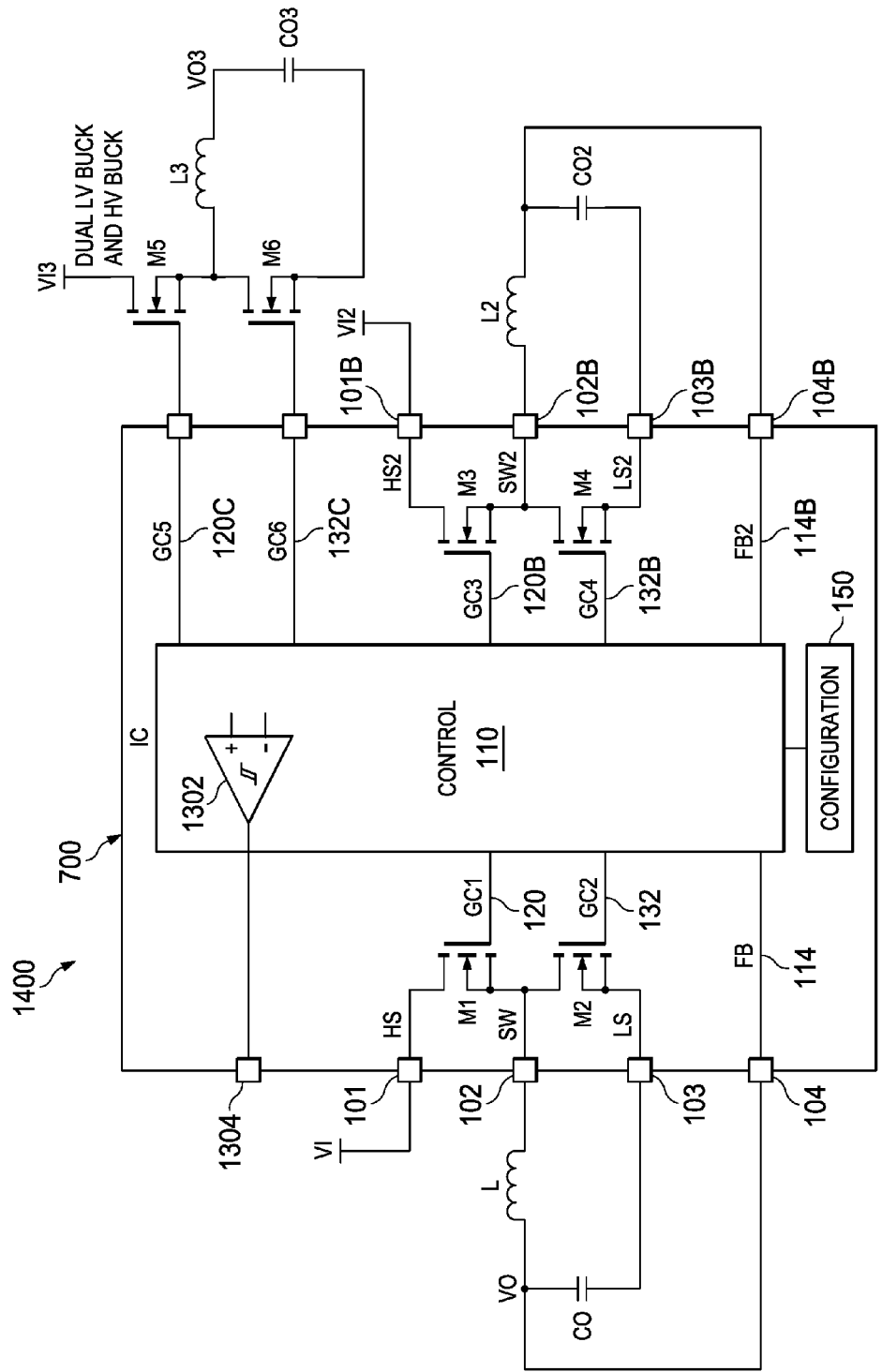
FIG. 14 shows the IC of FIG. 13 configured to implement a dual low-voltage buck converter topology as well as a high voltage buck converter topology.

FIG. 14 shows another example topology 14 including the IC 700 of FIG. 13 configured to implement a dual low-voltage buck converter topology using M1-M4, as well as a high voltage buck converter topology implemented using M5, M6, inductor L3, and a third output capacitor CO3 to provide an output voltage VO3. In one example, the IC 110 includes a further feedback pin or pad (not shown) to receive a third feedback signal representing the output voltage VO3. Like the example of FIG. 9 above, a first buck converter is implemented using an external first inductor L and a first output capacitor CO with transistors M1 and M2 operating according to pulse width modulated signals GC1 and GC2 from the control circuit 110 according to a first feedback signal FB received at the feedback pin 104. A second low-voltage buck converter is implemented using M3 and M4 operated according to PWM switch control signals GC3 and GC4 from the control circuit 110 using a second inductor L2 and a second output capacitor CO2 in order to provide a second output voltage VO2 connected as a second feedback signal FB2 via the pad 104B. The comparator 1302 can be omitted in this example.

Figure 15:
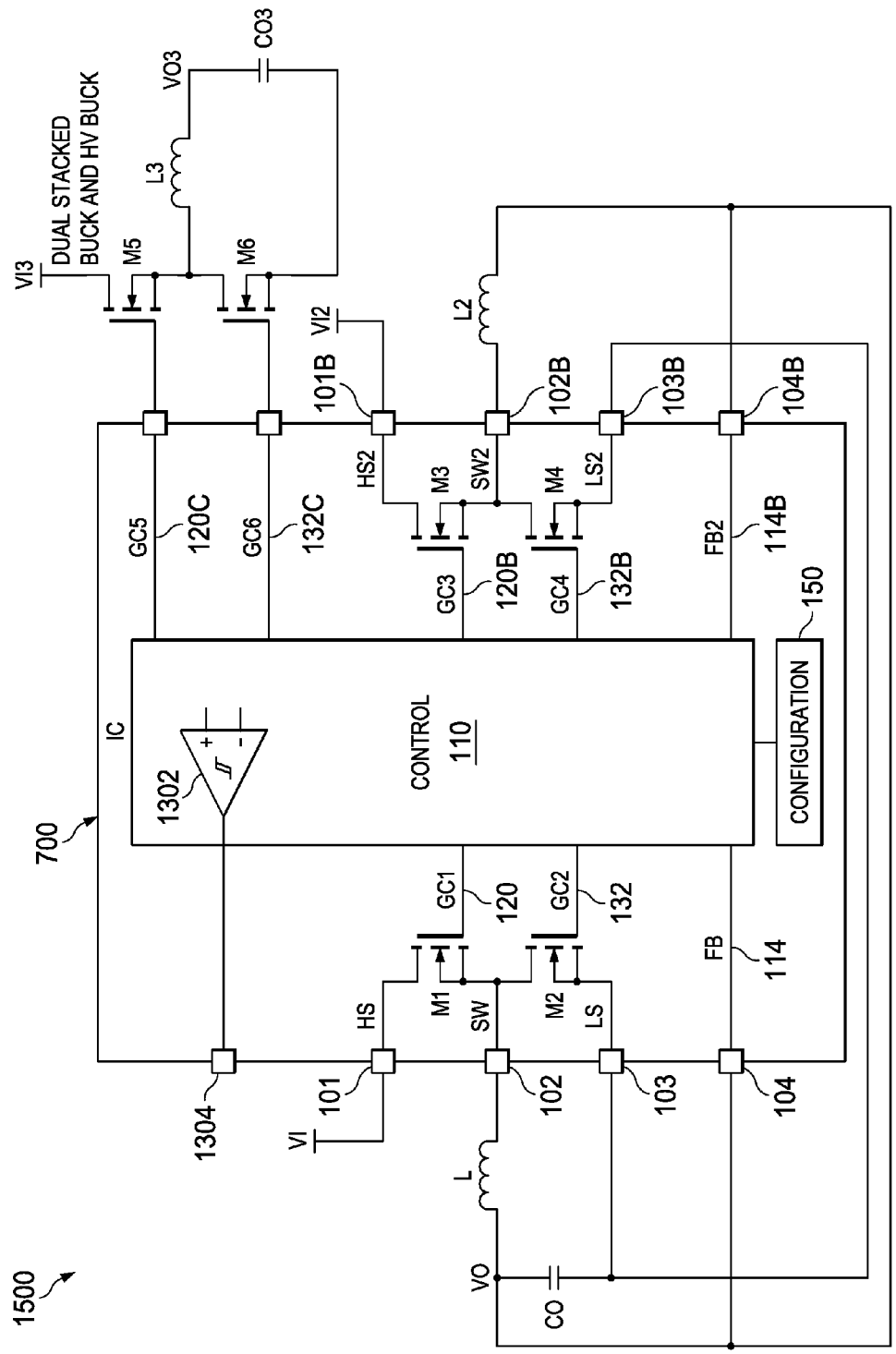
FIG. 15 shows the IC of FIG. 13 configured to implement a dual stacked buck power converter topology as well as a high voltage buck converter topology.

FIG. 15 shows the IC 700 of FIG. 13 in a configuration 1500 to implement a dual stacked buck power converter topology as well as a high voltage buck converter topology. The first and second switch circuits and the corresponding transistors M1-M4 are configured in this case like the example of FIG. 10 above to provide a dual stacked buck converter topology that provides an output voltage VO across an output capacitor CO using inductors L and L2 as previously described. The individual buck converters using M1, M2 and M3, M4 can be operated by separate input voltages VI and VI2 as shown, or a single input voltage (e.g., VI) can be used in other implementations. In addition, the configuration 15 also includes a high voltage buck converter implemented using external transistors M5 and M6, a third inductor L3, and an output capacitor CO3 in order to provide an output voltage VO3 by provision of PWM switch control signals GC5 and GC6 from the control circuit 110.

Figure 16:
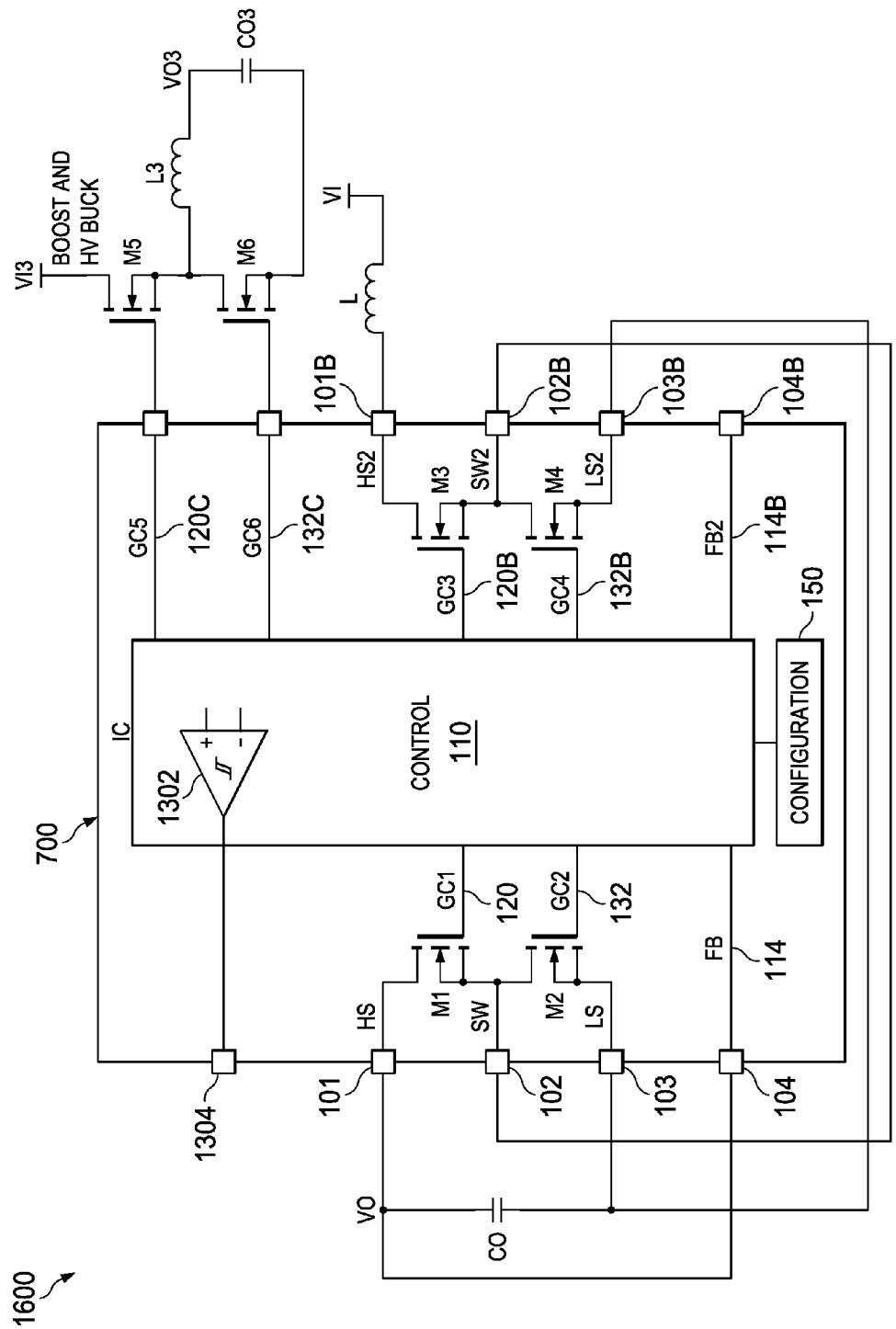
FIG. 16 shows the IC of FIG. 13 configured to implement a boost converter topology and a high voltage buck converter topology.

FIG. 16 shows the IC 700 of FIG. 13 in a configuration 1600 to implement a boost converter topology and a high voltage buck converter topology. The connections of external circuitry with the switches M1-M4 in this example is similar to that described above in connection with FIG. 11 to provide a boost converter using inductor L and output capacitor CO to provide a first output voltage VO. This topology 1600 also includes a high voltage buck converter implemented as described above using external transistors M5 and M6, inductor L3, and output capacitor CO3 to provide an additional output voltage VO3.

Figure 17:
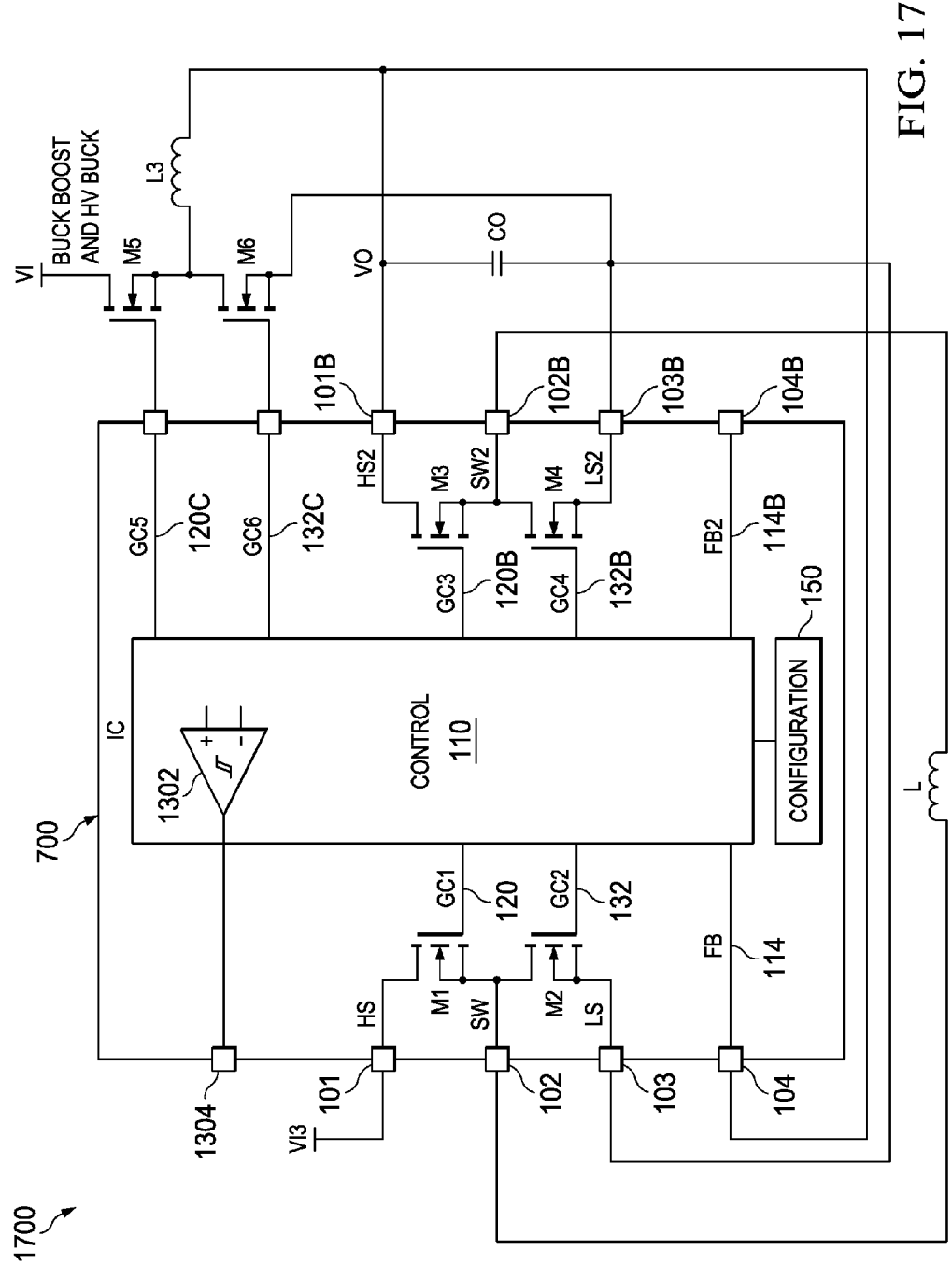
FIG. 17 shows the IC of FIG. 13 configured to implement a buck boost power converter topology in addition to a high voltage buck converter topology.

FIG. 17 shows the IC of FIG. 13 in a configuration 1700 to implement a buck boost power converter topology in addition to a high voltage buck power converter topology. This configuration uses an inductor L and an output capacitor CO to form a buck-boost power converter topology generally as described above in connection with FIG. 13 to convert power from an input voltage VI3 to control an output voltage VO across CO. In this example, moreover, the high-voltage buck converter provided by M5, M6 and L3 also drives the output voltage VO by PWM switch control signals GC5 and GC6 provided from the control circuit 110.

The above are merely several non-limiting examples of the numerous possible configurations to provide single or multiple power converter configurations apologies using the IC 100 or 700. The disclosed examples provide the novel ability to reconfigure a switching circuit to provide an output stage of a power converter within a single IC 100, 700, and also in the ability to automatically sense the configuration or circuit condition and set the proper control algorithm in the control circuit 110 inside the IC 100, 700. These advantages allow the same IC 100, 700 to be used for multiple applications, or multiple system scenarios in a single application. The buck and boost topologies can be differentiated by sensing the Vin-Vout differential via the comparator 244, since there is always a current path from Vin to Vout in a boost converter, and there is no such path in a buck converter unless the high side switch is turned on. The output voltage VO can be sensed in the test mode prior to power conversion control mode initiation and the configuration circuit 150 determines how to configure the power stage by setting the operating mode of the control circuit 110. The differentiation between switching converter and non-switching converters is done by detection of any connected inductor L in the test mode. One or more configuration pad conditions and also be detected to determine a user-specified configuration using pads 108.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The following is claimed:

1. An integrated circuit (IC), comprising:
switch circuit, including:
a first transistor with a first terminal connected to a first pad of the IC, a second terminal connected to a second pad of the IC, and a control terminal to receive a first switch control signal, and
a second transistor with a first terminal connected to the second pad, a second is terminal connected a third pad of the IC, and a control terminal to receive a second switch control signal;
a control circuit configurable according to a mode control signal to operate in one of a plurality of modes to provide the first and second switch control signals to implement a power converter using an external circuit connected to at least one of the first, second, and third pads, the control circuit including:
a first switch having a control input connected to the mode control signal, a linear mode position, a switched position, and an output coupled to the control terminal of the first transistor, and
a second switch having a control input connected to the mode control signal, a linear mode position, a switched position, and an output coupled to the control terminal of the second transistor; and
a configuration circuit to sense a circuit condition of the and to provide the mode control signal to configure the control circuit according to the sensed circuit condition,
wherein the configuration circuit includes a logic circuit to selectively provide the mode control signal to set the control circuit in a test mode while the configuration circuit senses the circuit condition of the IC; and
wherein the logic circuit is operative according to the sensed circuit condition to provide the mode control signal to selectively set the control circuit in either a first control mode to configure the control circuit to implement a low dropout or hot-swap power converter to provide the first switch control signal in a generally continuous fashion, or a second control mode to configure the control circuit to implement a switching power converter to provide the first switch control signal using pulse width modulation.

2. The IC of claim 1, wherein the logic circuit is operative according to the sensed circuit condition to: set the control circuit in the first control mode to implement the low dropout power converter to provide the first switch control signal in a generally continuous fashion according to a feedback signal and a reference signal, or set the control circuit in a third control mode to implement the hot-swap power converter to provide the first switch control signal in a generally continuous fashion according to a sensed current signal.

3. The IC of claim 1, comprising a comparator circuit, including a first input to sense an output voltage of the power converter, a second input to sense an input voltage of the power converter, and an output to provide a comparator signal to the logic circuit; wherein the logic circuit is operative according to the comparator signal to selectively set the control circuit in the second control mode to configure the control circuit to provide the first switch control signal and the second switch control signal using pulse width modulation to implement a buck converter or a boost converter.

4. The IC of claim 3, wherein the logic circuit is operative, when the comparator signal indicates that the output voltage of the power converter is less than the input voltage, to set the control circuit in the second control mode to provide the first switch control signal as a high side control signal, and to provide the second switch control signal as a low side control signal to implement a buck converter.

5. The IC of claim 3, wherein the logic circuit is operative, when the comparator signal indicates that the output voltage of the power converter is greater than the input voltage, to set the control circuit in the second control mode to provide the first switch control signal as a low side control signal, and to provide the second switch control signal as a high side control signal to implement a boost converter.

* * * * *